Nov. 20, 1956     C. F. JAGSCH     2,771,318
VENDING TRAILER

Filed Dec. 29, 1954                                3 Sheets-Sheet 1

INVENTOR.
CARL F. JAGSCH
BY
*Corbett, Mahoney & Miller*
ATTORNEYS

Nov. 20, 1956 C. F. JAGSCH 2,771,318
VENDING TRAILER
Filed Dec. 29, 1954 3 Sheets-Sheet 2

INVENTOR.
CARL F. JAGSCH
BY
Corbett, *[signature]*
ATTORNEYS

Nov. 20, 1956 C. F. JAGSCH 2,771,318
VENDING TRAILER

Filed Dec. 29, 1954 3 Sheets-Sheet 3

INVENTOR.
CARL F. JAGSCH
BY
ATTORNEYS 2,771,318
VENDING TRAILER

Carl F. Jagsch, Columbus, Ohio, assignor to Timmons Metal Products Co., Columbus, Ohio, a corporation of Ohio Application December 29, 1954, Serial No. 478,309

8 Claims. (Cl. 296—22)

My invention relates to a vending trailer. It has to do, more specifically, with a trailer of the type which can be readily transported from place to place and which can be used in vending beverages, sandwiches, etc. at various sporting events, picnics, etc.

This general type of trailer is used quite extensively. It is desirable that this type of trailer be as compact as possible to facilitate transportation. Therefore, prior art trailers of this type are usually made small and provide only enough room for one attendant to serve the public. Furthermore, as these trailers have been made in the past, there is no way in which the contents of the trailer can be locked up for security which is desirable when the attendant is not present and also during transportation.

It is one of the objects of my invention to provide a vending trailer of the general type indicated but which can be expanded for vending use so that more than one attendant can serve from it, or can be contracted into a compact unit for transportation.

Another object of my invention is to provide a trailer of the type indicated which is of such a nature that when contracted it can be locked to secure its contents.

Another object of my invention is to provide a trailer of the type indicated which is of a rugged nature both in its expanded and contracted forms.

A further object of my invention is to provide a trailer of the type indicated which can be expanded or contracted with ease by one person.

Another object of my invention is to provide a trailer of the type indicated above which can be fabricated at a relatively low cost.

Other objects will be apparent hereinafter.

According to my invention, I provide a two-wheel trailer which can be towed behind a car or other suitable towing vehicle. When it is being towed, or when not in use for service, the trailer is in folded or contracted condition and will provide a completely enclosed storage compartment which may be locked for security. When it is to be used for vending or service, certain walls of the trailer can be unfolded so that a much greater area is enclosed to provide a much larger service enclosure having a floor, sidewalls, and a countertop extending completely therearound.

The preferred embodiment of my invention is illustrated in the accompanying drawings wherein similar characters of reference designate corresponding parts and wherein.

Figure 1:
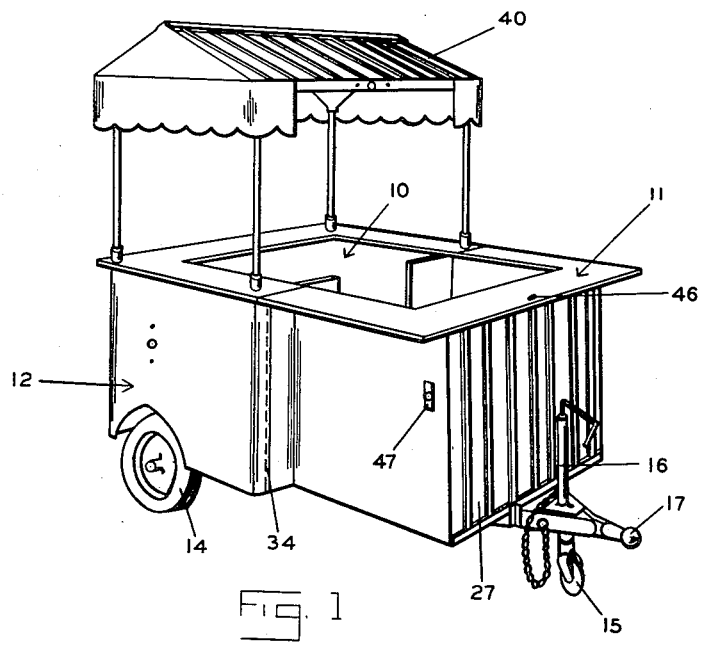
Figure 1 is a perspective view of the trailer in extended or expanded condition, ready for vending use.

With reference to the drawings, in Figure 1 I have illustrated the trailer in expanded condition for vending or serving. In this condition, a serving enclosure 10 is provided within a rectangular counter 11 which extends completely therearound. The serving enclosure 10 will be sufficiently large for at least two attendants.

Figure 3:
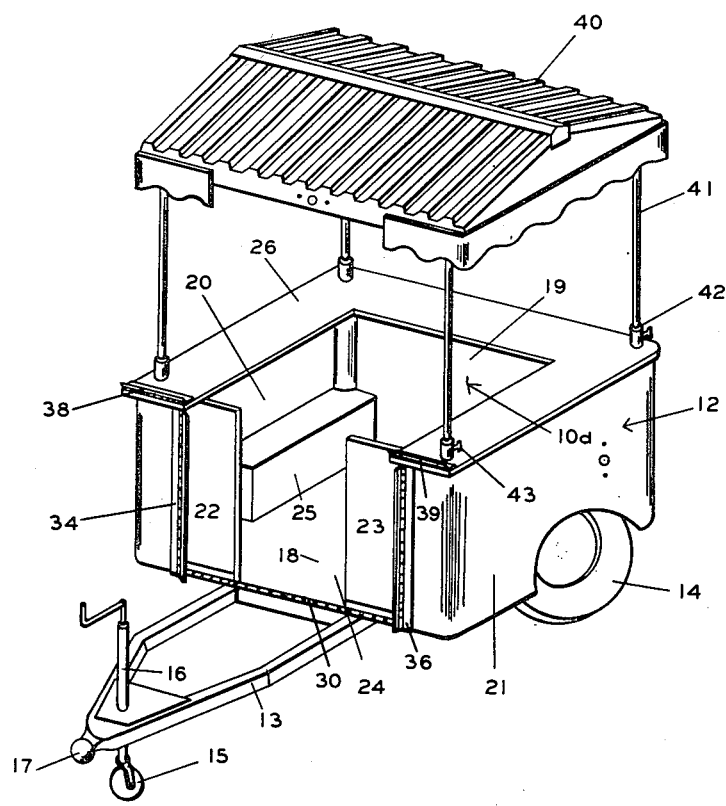
Figure 3 is a perspective view of the main body of the trailer to which the parts of Figure 2 are to be attached.

The main body 12 of the trailer, as shown in Figure 3, is carried by a towing frame 13. This frame 13 extends forwardly of the main body a considerable distance. The rear end of the frame is carried by the two wheels 14 whereas its front end is provided with a caster wheel 15 carried by a jack 16. The front end of the frame is further provided with a towing tongue 17.

The body 12 is fabricated preferably of metal plates into a rigid structure having the floor 18, the upstanding side walls 20 and 21, and the forward wall sections 22 and 23 which are spaced apart to provide a passageway 24. The floor and sidewalls have the wheel wells 25 formed therein for the wheels 14. Along the upper edges of the upstanding walls 19, 20, and 21, a fixed counter 26 is provided which is U-shape in plan.

Figure 2:
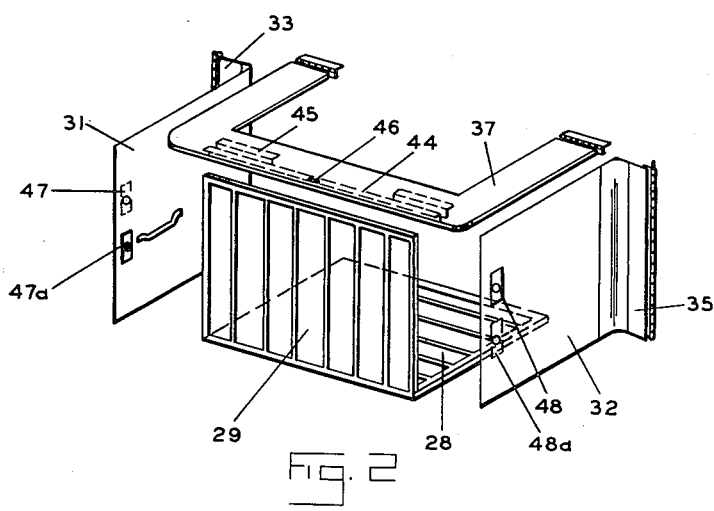
Figure 2 is a perspective view illustrating various parts which are attached to the main body of the trailer to provide for extension of the trailer for vending use or contraction of the trailer for security of its contents or for transportation of the trailer to a different location.

To provide for locking the compartment 10a within the body 12 and to provide for expansion to provide the larger enclosure 10, the parts of Figure 2 are attached to the body 12 of Figure 3.

Figure 4:
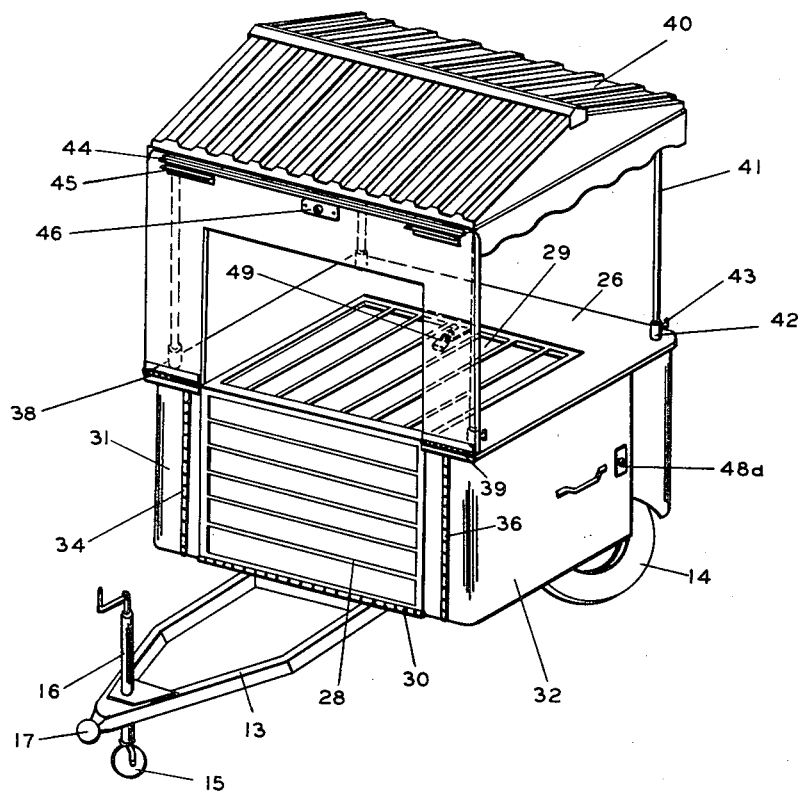
Figure 4 is a perspective view showing the trailer folded or contracted for security or for transportation.

One of these parts is an L-shaped floor extension section 27. This section has the inner floor panel 28 (Figure 2) and the outer panel 29 at right angles to each other. The free edge, that is the rear edge, of the panel 28 is hinged to the forward edge of the floor 18 of the body 12 by the hinge 30 (Figure 4). Other parts are the two sidewall sections 31 and 32. The section 31 at its rear edge is provided with an outturned flange 33 which is hinged to the front surface of the forward wall section 22 of the body 12 by a hinge 34 (Figure 1). It will be noted that this hinge 34 is spaced inwardly from the corner of the body 12. Similarly, the sidewall section 32 is provided with an outturned flange 36, which is hinged to the front surface of the forward wall section 23 of the body 12 by a hinge 36 (Figure 4) which is also spaced inwardly from the adjacent corner of the body 12. The remaining part is a U-shaped counter extension section 37. The free ends, that is the rear edges, of this section 37 are hinged by the hinges 38 and 39 to the forward ends of the fixed counter section 26 (Figure 4).

Over the main body 12 of the trailer I provide a top or awning 40 which is preferably made of sheet metal. This awning 40 is supported by the four posts 41 which telescope into socket sleeves 42 carried by the fixed counter 26. The posts 41 may be slipped in and out of the sockets 42 to adjust the top 40 to the proper height. The posts 41 are held in adjusted position by setscrews 43 which are threaded into the sleeves 42.

As previously indicated, in serving or vending condition the trailer appears as in Figure 1. At this time, the trailer has been expanded to provide an enclosure 10 about twice the area of the compartment 10a provided in the body 12. The floor panel 28 of the hinged L-shaped floor extension section 27, at this time, rests on the forward extension of the frame 13. The panel 29 thereof is upright and serves as the forward wall of the enclosure 10. The sidewalls thereof are formed by the hinged sidewall sections 31 and 32. The hinged counter extension 37 is in horizontal position and serves as a flush extension of the fixed counter 26. The counter extension section 37 is provided with an angle 44 welded to its lower surface, which extends substantially its full width, and a pair of angle sections 45 spaced from the angle 44 and adjacent its ends, which will be positioned forwardly and rearwardly of the upper edge of the panel 29. The side walls are provided with friction catches 47a and 48a of a suitable type which engage openings in the edges of the panel 29 to hold them in the positions shown in Figure 1.

Also, as previously indicated, if the trailer is to be transported to another location or if it is merely to be secured while the attendant or attendants are absent, it can be folded or contracted readily into the condition shown in Figure 4. To do this, the hinged counter section 37 is swung upwardly, after first releasing the latches 44a and 45a. It is held in this upper position by a latch 46 between it and the forward edge of the top 40. Next, the sidewall sections 31 and 32 are swung forwardly and the respective flanges 33 and 35 thereof will permit these sections to be swung outwardly and forwardly into flat relationship with the respective sidewalls 20 and 21 of the body 12. Latches 47 and 48 are provided, respectively, between the section 31 and sidewall 20 and between the section 32 and sidewall 21 to hold the hinged sections in these forward positions. Next, the L-section 27 is swung forwardly. The panel 29 is of such size that when it is swung upwardly into horizontal position it will just fill the space between the U-shape fixed counter 26, as shown in Figure 4, whereas the panel 28 will overlap the forward wall sections 22 and 23 and close the passageway 24. Thus, the compartment 10a will be enclosed completely and can be locked by a padlock arrangement 49 provided on the associated edges of the panel 29 and the counter 26.

It will be apparent that I have provided a novel vending or service trailer which can be expanded or contracted with ease. When expanded, it encloses considerable area for storage of products and considerable counter space for serving. When contracted, it is very compact and provides a completely enclosed compartment which can be locked for security. Also, when contracted, it is much easier to transport to another location.

Various other advantages will be apparent.

Having thus described my invention, what I claim is:

1. A serving trailer comprising a main body providing a compartment of rectangular form having a rectangular floor and upright side walls along three edges thereof with a fixed serving counter extending along the upper edge of all of said upright side walls, hinged extension parts on said main body which, when unfolded, will provide a service enclosure of greater area than said compartment with a counter extending completely therearound and comprising a floor extension hinged to said floor at its remaining edge, a counter extension hinged to said fixed counter, and side wall extensions hinged to said side walls and movable between said counter extension and said floor extension to support the counter extension at the same level as said fixed counter.

2. A serving trailer according to claim 1 in which the floor extension has a floor extension panel and a second panel at right angles thereto, said second panel serving to cooperate with the fixed counter to close the top of said compartment when the trailer is in non-extended condition.

3. A serving trailer comprising a wheeled frame; a main body carried by said frame and providing a rectangular compartment having a floor, an upright rear end wall, two upright sidewalls, an upright front wall having a passageway therethrough, and a U-shape counter along the rear and sidewalls; a set of hinged extension parts hinged on said main body which, when unfolded, will provide a serving enclosure of greater area than said compartment and comprising a U-shape counter extension having its ends hinged to the ends of the fixed U-shape counter for vertical swinging movement, a pair of upright sidewall extensions hinged to the body adjacent its forward corners for swinging movement in a horizontal plane, a floor extension of L-shape having inner and outer panels and having the inner edge of its inner panel pivoted to the rear edge of said floor for vertical swinging movement, the outer panel of said floor extension being upright beneath the counter extension and its inner panel being level with said floor, when the trailer is extended, said sidewall extensions being between the inner panel of the floor extension and the counter extension and said outer panel of the floor extension being beneath the counter extension when the trailer is extended to support it level with said fixed counter, said floor extension having its outer panel fitting into the space within the U-shape fixed counter when swung into its upper position to close the top of said compartment and having its inner floor panel upright to close said passageway in said front wall of said body.

4. A serving trailer according to claim 3 including interfitting locating portions between said counter extension and the upright outer panel of said floor extension and latches between said upright panel and said upright sidewall extensions.

5. A serving trailer according to claim 3 in which the upright sidewall extensions have hinge flanges which are hinged to the forward wall of said body at points spaced inwardly from the corners thereof so that they can be swung rearwardly into contact with said upright sidewalls when the trailer is contracted.

6. A serving trailer according to claim 5 including means for latching said sidewall extensions in such rearward positions.

7. A serving trailer according to claim 6 in which a top is provided over said compartment and is supported thereby for vertical adjustment.

8. A serving trailer according to claim 7 in which the counter extension swings upwardly and rearwardly into contact with said top, and means for latching it in such position.

References Cited in the file of this patent

UNITED STATES PATENTS

| | | |
|---|---|---|
| D. 156,547 | Madison | Dec. 20, 1949 |
| 819,057 | Gerhart | May 1, 1906 |
| 1,599,911 | Morehart | Sept. 14, 1926 |